(12) United States Patent
Mancl et al.

(10) Patent No.: US 8,297,949 B1
(45) Date of Patent: Oct. 30, 2012

(54) BEARING SEAL FOR A WET VACUUM MOTOR

(76) Inventors: Scott C. Mancl, Bluff City, TN (US); Dennis J. Mancl, Bluff City, TN (US)

( * ) Notice: Subject to any disclaimer, the term of this patent is extended or adjusted under 35 U.S.C. 154(b) by 304 days.

(21) Appl. No.: 12/653,823

(22) Filed: Dec. 21, 2009

Related U.S. Application Data

(60) Provisional application No. 61/207,774, filed on Feb. 17, 2009.

(51) Int. Cl.
*F04B 17/00* (2006.01)
*F04B 35/04* (2006.01)

(52) U.S. Cl. ............ 417/423.11; 417/423.12; 417/423.5

(58) Field of Classification Search ............. 417/423.11, 417/423.12, 423.5; 384/477, 479, 481, 482, 384/484, 485; 277/913, 928, 929, 551, 552
See application file for complete search history.

(56) References Cited

U.S. PATENT DOCUMENTS

| | | | | |
|---|---|---|---|---|
| 3,056,608 | A * | 10/1962 | Flynn | 277/558 |
| 3,733,150 | A | 5/1973 | Porter et al. | |
| 3,932,070 | A | 1/1976 | Porter et al. | |
| 4,088,424 | A | 5/1978 | Hyatt et al. | |
| 4,139,203 | A * | 2/1979 | Garrison | 277/348 |
| 4,194,745 | A * | 3/1980 | McDougal | 277/411 |
| 4,226,575 | A | 10/1980 | Hyatt et al. | |
| 4,527,960 | A | 7/1985 | DeSisto | |
| RE32,027 | E | 11/1985 | Hyatt et al. | |
| 4,865,332 | A * | 9/1989 | Ruetz | 277/347 |
| 5,482,378 | A | 1/1996 | Vona, Jr. et al. | |
| 5,894,180 | A * | 4/1999 | Volz et al. | 310/89 |
| 6,472,786 | B1 | 10/2002 | McCauley et al. | |
| 6,685,445 | B2 * | 2/2004 | Wu | 417/423.11 |
| 6,692,202 | B2 * | 2/2004 | Katsuzawa et al. | 409/135 |
| 6,715,765 | B2 * | 4/2004 | Machida | 277/409 |
| 6,779,964 | B2 * | 8/2004 | Dial | 415/1 |
| 6,952,062 | B1 * | 10/2005 | Mancl et al. | 310/90 |
| 6,987,338 | B1 * | 1/2006 | Lavasser et al. | 310/71 |
| 7,011,452 | B2 * | 3/2006 | Suzuki et al. | 384/486 |
| 7,265,468 | B1 * | 9/2007 | Mancl et al. | 310/90 |
| 7,291,192 | B1 * | 11/2007 | Lavasser et al. | 55/406 |
| RE41,212 | E * | 4/2010 | Lavasser et al. | 55/406 |
| 2003/0001444 | A1* | 1/2003 | Coles et al. | 310/90 |
| 2003/0116921 | A1* | 6/2003 | Coles et al. | 277/572 |
| 2004/0170346 | A1* | 9/2004 | Komeda et al. | 384/479 |
| 2009/0280004 | A1* | 11/2009 | Finkenbinder et al. | 415/174.5 |
| 2011/0150630 | A1* | 6/2011 | Takarai | 415/111 |

* cited by examiner

*Primary Examiner* — Devon Kramer
*Assistant Examiner* — Christopher Maxey
(74) *Attorney, Agent, or Firm* — www.bobharter.com; Robert J. Harter

(57) ABSTRACT

A seal actuated by generally atmospheric pressure helps protect the motor bearing of a vacuum appliances, such as a dry air vacuum cleaner, a wet/dry vacuum cleaner, a water extractor (e.g., carpet cleaner), etc. The generally atmospheric air pressure on a motor side of the seal and a vacuum on an opposite turbine side of the seal urges the seal in an axial direction toward an impeller of the vacuum appliance and presses the seal firmly against an axially abutting sealing surface. Sliding sealing contact between a broad axial surface of the seal and the abutting sealing surface helps prolong the life of the seal and the bearing.

11 Claims, 7 Drawing Sheets

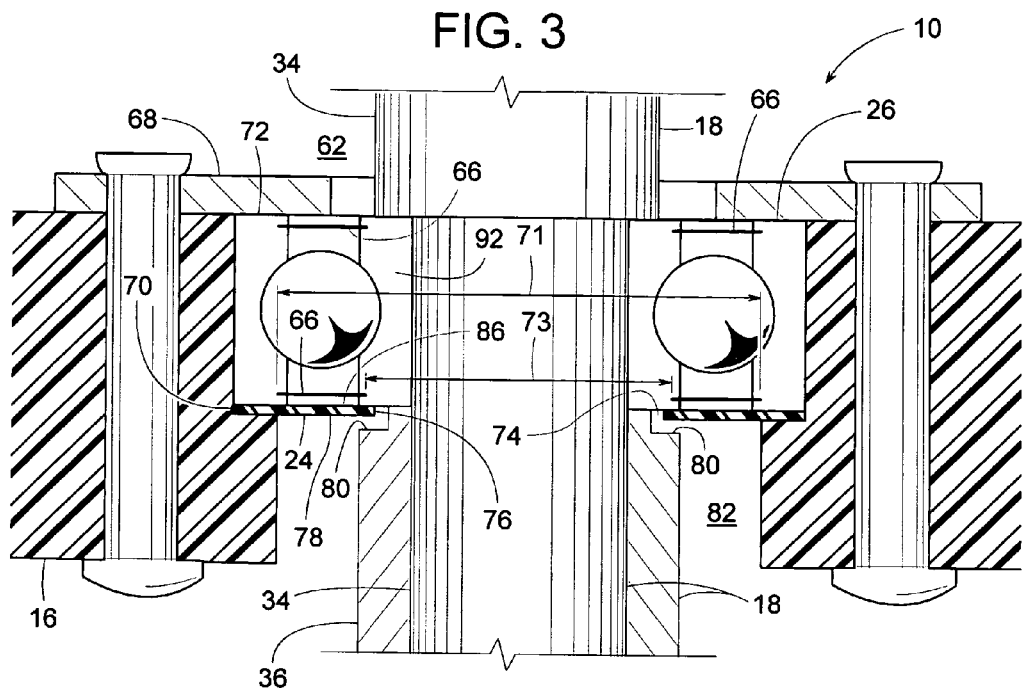
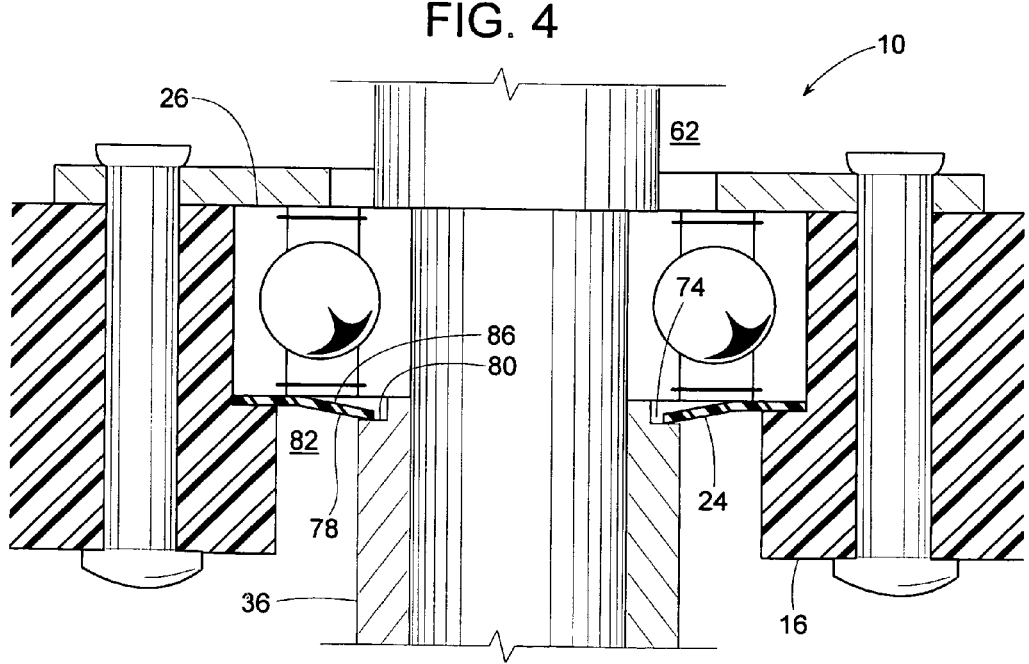

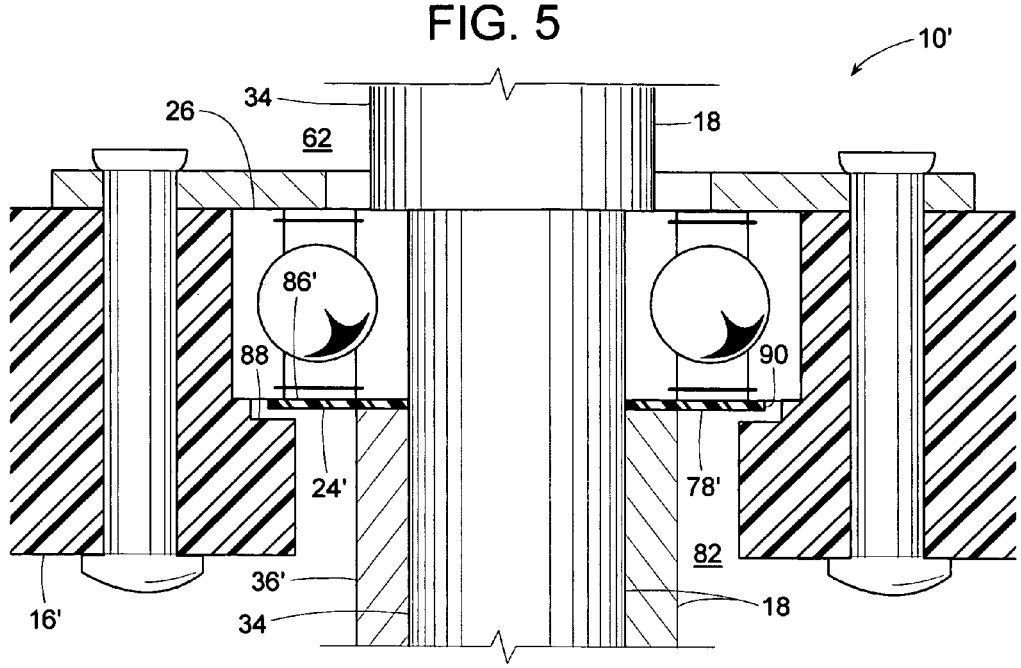
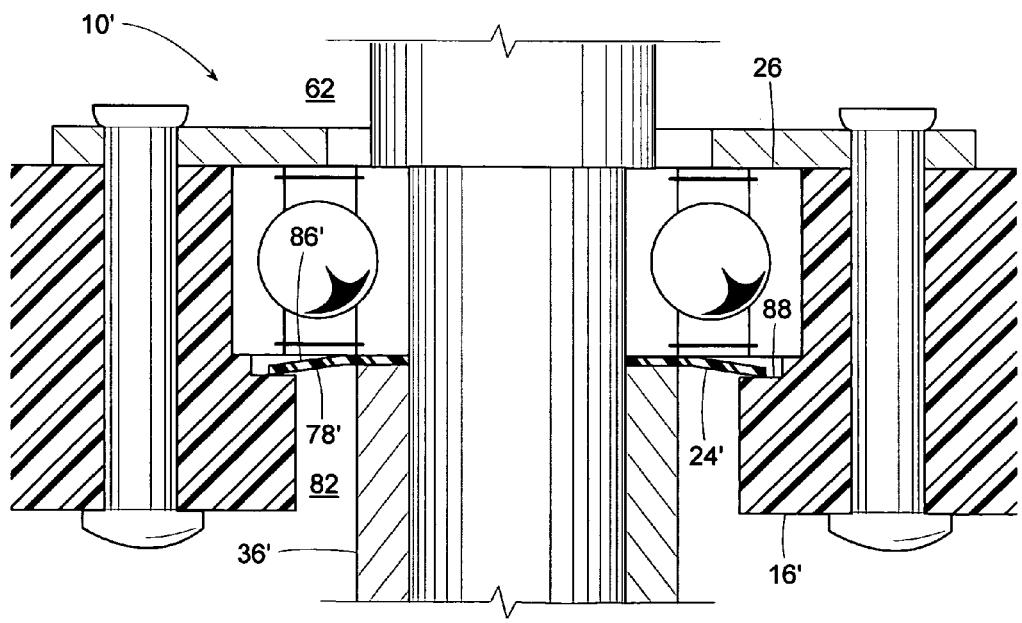

BEARING SEAL FOR A WET VACUUM MOTOR

CROSS-REFERENCE TO RELATED APPLICATIONS

This application claims the benefit of provisional patent application Ser. No. 61/207,774, filed Feb. 17, 2009 by the present inventors.

FIELD OF THE INVENTION

The subject disclosure generally pertains to wet vacuum motors and more specifically to means for protecting a bearing of such a motor.

BACKGROUND

Vacuum appliances, such as a dry air vacuum cleaner, a wet/dry vacuum cleaner, a water extractor (e.g., carpet cleaner), etc., often include an electric motor that drives an impeller to draw in dirty or moist air. Air contaminated with dirt or moisture, unfortunately, can damage a motor bearing that is near the impeller, particularly if the bearing is of a high speed universal motor, such as those typically found in lightweight portable appliances. Various means for protecting a motor bearing are disclosed in U.S. Pat. Nos. 4,226,575; 4,527,960; 5,482,378; 3,733,150; 3,932,070; 4,088,424; Re. 32,027; and 6,472,786. In spite of the current bearing protection schemes, there is an ongoing need to further prolong the life of motor bearings in a vacuum appliance.

BRIEF DESCRIPTION OF THE DRAWINGS

FIG. 3 is an enlarged cross-sectional view of the seal in FIG. 1, wherein the motor is de-energized.

FIG. 4 is a cross-sectional view similar to FIG. 2 but with the motor energized.

FIG. 5 is a cross-sectional view similar to FIG. 2 but showing another seal example.

FIG. 6 is a cross-sectional view similar to FIG. 3 but showing the seal example of FIG. 4.

DETAILED DESCRIPTION

Figure 1:
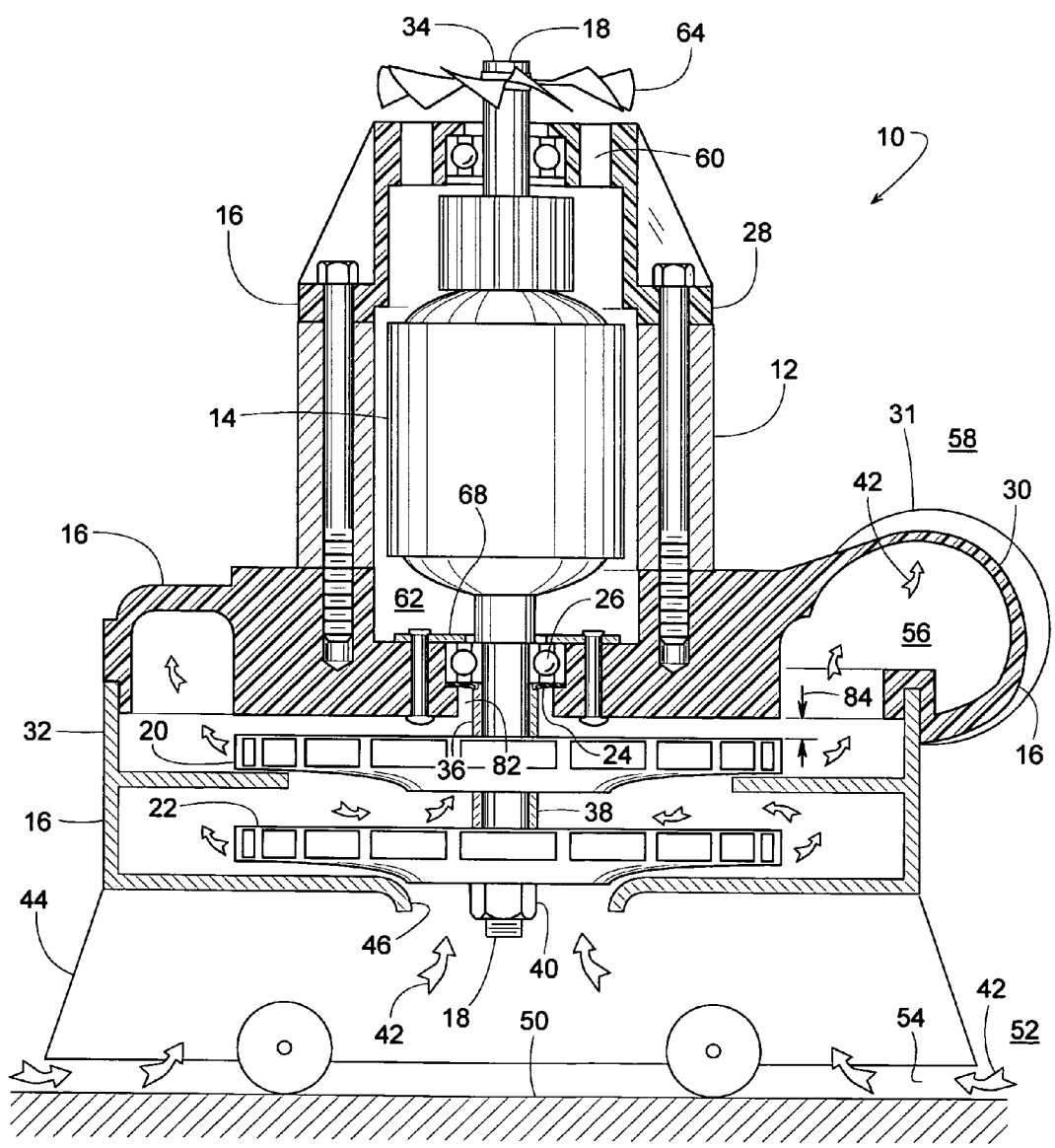
FIG. 1 is a cross-sectional view of an example motor for a vacuum appliance, wherein the motor includes a seal according to some examples of the invention.

An example wet vacuum motor 10, shown in FIGS. 1-4, comprises a stator 12, a rotor 14 in proximity with stator 12 to be driven by the stator's electromagnetic field, a housing assembly 16 that supports stator 12, a shaft 18 extending from rotor 14, at least one impeller 20 and 22 mounted to shaft 18 (the vacuum motor can have any number of impellers), at least one bearing 26 attached to housing assembly 16 and supporting shaft 18, and a pressure-reactive external seal 24 proximate to bearing 26 and encircling shaft 18.

Seal 24 is referred to herein as an "external" seal because seal 24 is outside of bearing 26 (i.e., seal 24 is beyond the axial outer face of bearing 26). In comparison, some examples of bearing 26 include an internal seal/shield 66 captured radially between an inner race 92 and an outer race 72 of bearing 26. The term "seal/shield" is used herein to encompass both a polymeric bearing insert known as a seal and a metallic bearing insert known as a shield.

Figure 2:
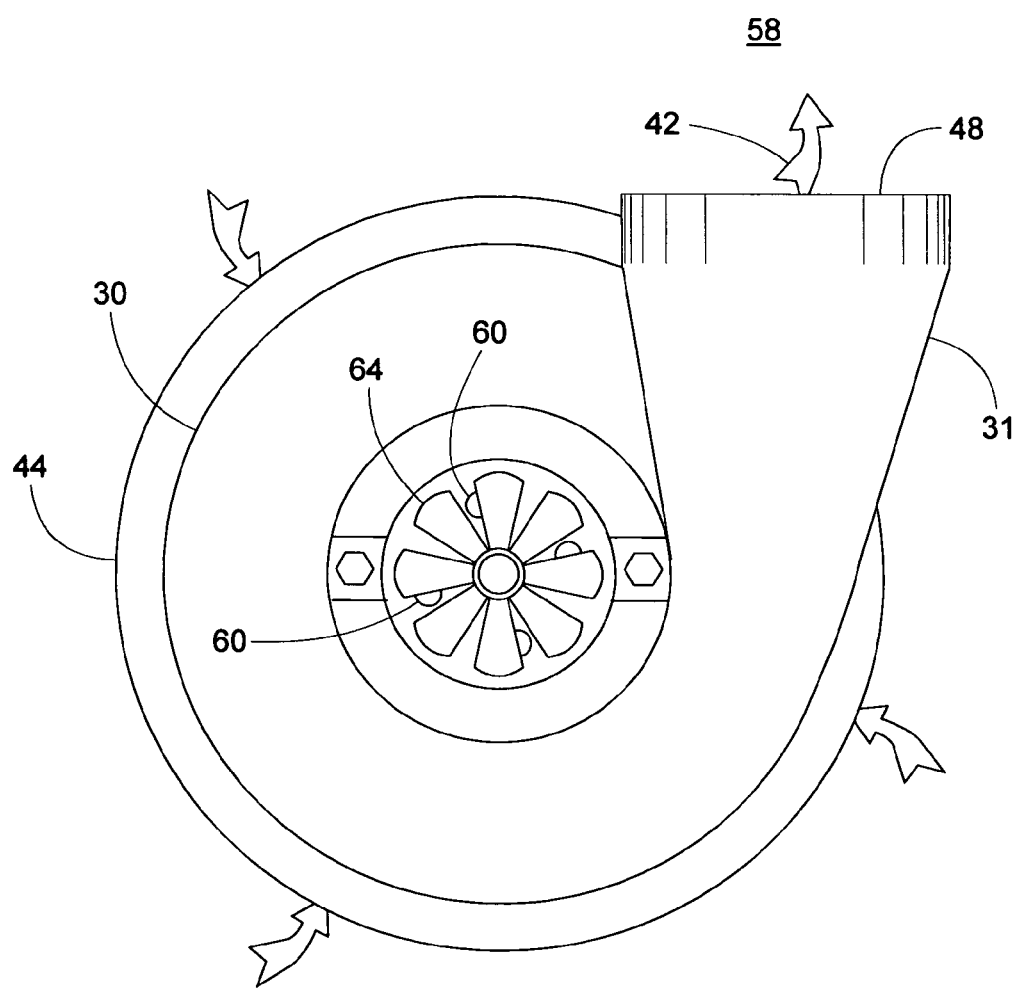
FIG. 2 is a top view of FIG. 1.
Figure 9:
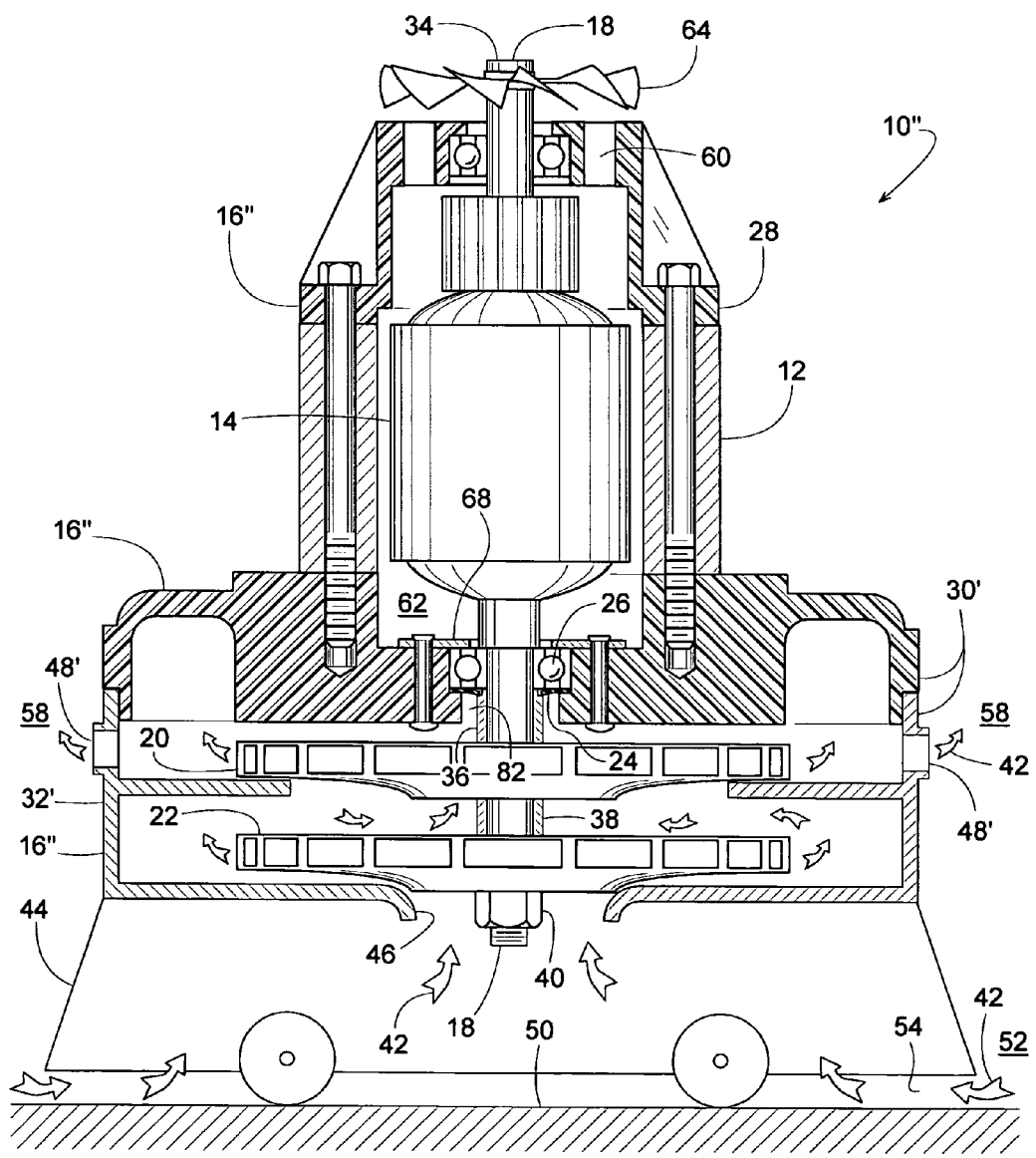
FIG. 9 is a cross-section view similar to FIG. 1 but showing another example of a motor.
Figure 10:
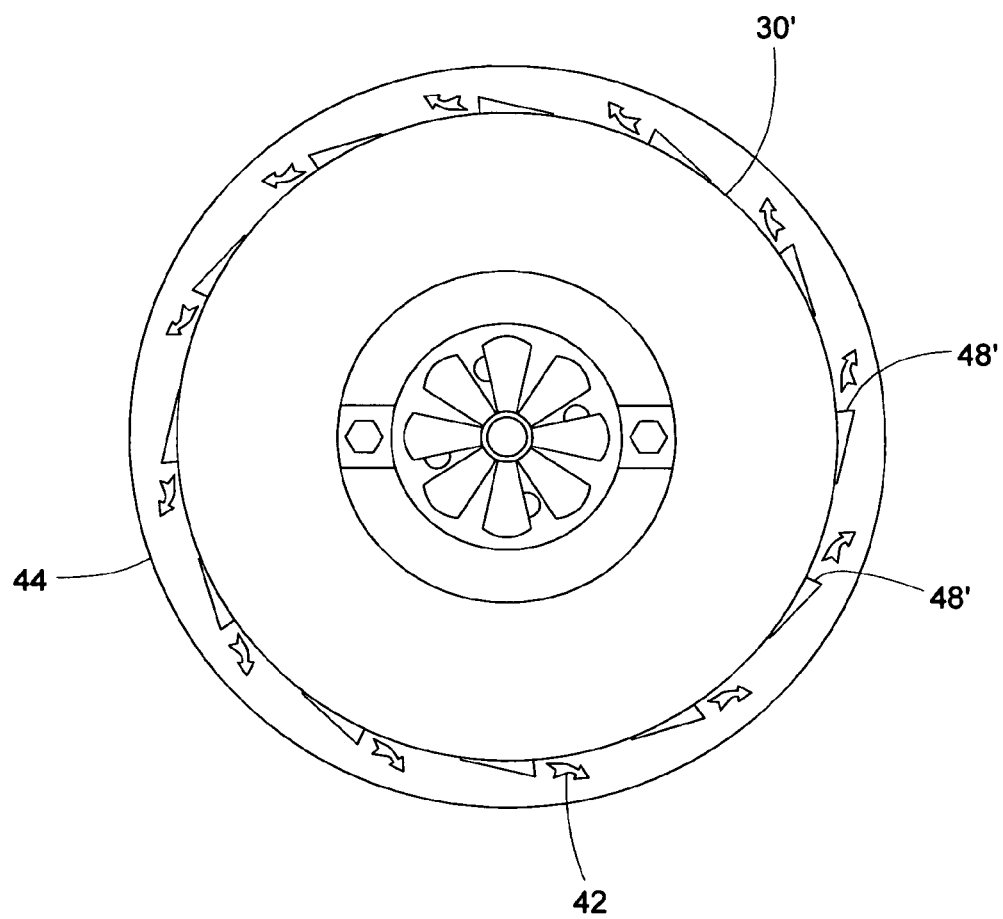
FIG. 10 is a top view of FIG. 9.

In the example of FIGS. 1-4, housing assembly 16 includes a motor bracket 28, a discharge housing 30, and a two-stage impeller housing 32. In the example of FIGS. 1 and 2, discharge housing 30 includes a tangential discharge horn 31 for discharging air 42 from a discharge area 56 out through a discharge opening 48. In the example of FIGS. 9 and 10, however, a discharge housing 30' includes an impeller housing 32', which provides a series of peripheral discharge openings 48' for releasing discharge air 42. In some examples, impeller housing 32 comprises a plurality of nested impeller sections to facilitate assembly. In some multi-stage examples, conventional air guides and/or stationary guide vanes are axially interposed between impellers to help guide the air discharged from one impeller to the suction inlet of the next stage impeller. Since the actual design of impeller housing 32 can vary greatly while still remain within the scope of the invention, FIG. 1 shows impeller housing 32 illustrated somewhat schematically. Examples of other design features of multi-stage impeller housings and/or other conventional components related thereto are disclosed in U.S. Pat. Nos. 4,226,575; 4,527,960; 5,482,378; 3,733,150; 3,932,070; 4,088,424; Re. 32,027; and 6,472,786; all of which are specifically incorporated by reference herein.

Shaft 18 can be a unitary piece or an assembly. In the illustrated example, shaft 18 comprises a main shaft 34, a sleeve 36 (sleeve 36' in FIGS. 5-8) slid over main shaft 34 and axially clamped between bearing 26 and impeller 20, and a second sleeve 38 slipped over main shaft 34 and axially clamped between impellers 20 and 22. Sleeves 36, 36' and 38 serve as spacers that establish the axial positions of impellers 20 and 22 within housing 32. In this example, a nut 40 holds impellers 20 and 22 to shaft 18 (shaft 18 comprises main shaft 34, sleeve 36, and sleeve 38).

Rotation of rotor 14 and shaft 18 rotates impellers 20 and 22 to centrifugally force air 42 sequentially through a vacuum appliance 44, a suction port 46 of impeller housing 32, first stage impeller 22, second stage impeller 20, area 56 of discharge housing 30, and out through discharge opening 48. Vacuum appliance 44 (which happens to be shown being adjacent a floor surface 50) is schematically illustrated to represent any device for sucking air 42. Examples of appliance 44 include, but are not limited to, a dry air vacuum cleaner, a wet/dry vacuum cleaner, a water extractor (e.g., carpet cleaner), etc.

The rotation of impellers 20 and 22 creates subatmospheric pressure at suction port 46, while air just beyond appliance 44 (at an area 52) is at generally atmospheric pressure, thus air flows from area 52, through an inlet gap 54 between appliance 44 and surface 50, to suction port 46. In various examples of the invention, one or more appliance components exist between inlet gap 54 and suction port 46. Examples of such appliance components include, but are not limited to, a filter, screen, guarding, shield, baffle, hose, tube, conduit, stationary brush, rotating brush, vortex tube, etc. Impellers 20 and 22 centrifugally increase the air's pressure from subatmospheric pressure at suction port 46 to something above atmospheric pressure at discharge area 56 within discharge housing 30. With the air at discharge area 56 being greater than atmospheric pressure, the air readily flows out through discharge opening 48 (FIG. 2) to exhaust to an area 58 at generally atmospheric pressure just beyond discharge opening 48. In various examples of the invention, one or more appliance components exist between discharge opening 48 and area 58. Examples of such appliance components include, but are not limited to, a filter, vortex tube, screen, guarding, shield, baffle, hose, tube, conduit, muffler, etc.

To cool motor 10, housing assembly 16 includes vents 60 or other openings that allow ambient air to circulate among rotor 14, stator 12, and an open space 62 between bearing 26 and rotor 14. In some embodiments, a fan 64 attached to shaft 18 helps promote the circulation of air for cooling motor 10.

To help prevent dirty and/or moisture laden air in discharge area 56 from entering bearing 26, motor 10 includes a flexible annular external seal 24 encircling shaft 18 near bearing 26. Although bearing 26 might include its own internal seal/shields 66, external seal 24 provides bearing 26 with remarkably better protection, partially due to external seal 24 having a greater axial sealing contact area than internal seal/shield 66. In some examples, external seal 24 has an outer radial periphery 70 (outermost radial periphery) that is greater than an outer diameter 71 of internal seal/shield 66, and/or in some examples, external seal 24 has an inner radial periphery 76 (innermost radial periphery) that is smaller than an inner diameter 73 of internal seal/shield 66. Radial air clearance at a radial periphery of seal 24 minimizes the seal's drag on the motor's rotation and allows an axial face of seal 24 to deflect and seal against an axial abutment surface on bearing 26, shaft 18 or housing assembly 16.

In the example shown in FIGS. 1-4, external seal 24 is axially interposed between bearing 26 and impeller 20. Bearing 26 can be held in place by any suitable means including, but not limited to, a press fit, adhesive, mechanical clamping, etc. In some examples, for instance, a bearing retainer 68 axially clamps the seal's outer radial periphery 70 (e.g., seal's outside diameter) between housing assembly 16 and outer race 72 of bearing 26.

Radial air clearance 74 between the seal's inner radial periphery 76 (e.g., the inside diameter of seal 24) and an outer diameter of shaft 18 (e.g., sleeve 36 of shaft 18) allows a turbine side 78 of seal 24 the freedom to deflect (in some examples of the invention) and seal against an axial abutment surface 80 on shaft 18 (e.g., sleeve 36 of shaft 18). Such deflection is driven by a pressure differential across 24, wherein the pressure differential is due to a motor side 86 of seal 24 being exposed to generally atmospheric pressure at open space 62 and turbine side 78 of seal 24 being exposed to a vacuum in a dead-space area 82. The term, "vacuum" means subatmospheric pressure, i.e., pressure less than atmospheric pressure. The expression, "generally atmospheric pressure" in open space 62 includes pressure slightly above atmospheric pressure due to inconsequential pressure effects caused by fan 64. In other words, "generally atmospheric pressure" means that even if the pressure in open space 62 were exactly equal to atmospheric pressure, such zero pressure would still be sufficient to urge seal 4 against abutment surface 80.

Since discharge area 56 is at a discharge air pressure that is greater than atmospheric pressure, one might expect that dead-space area 82, between bearing 26 and impeller 20, would also be greater than atmospheric pressure, as areas 82 and 56 are in open fluid communication with each other (turbine side 78 of seal 24 is in open fluid communication with discharge opening 48). And if the pressure at dead-space 82 were greater than atmospheric pressure while area 62 above bearing 26 is at generally atmospheric pressure, one might expect an air pressure differential across seal 24 to urge seal 24 toward rotor 14, but actually just the opposite is true.

An axial clearance 84 between impeller 20 and housing assembly 16 is sufficiently small (e.g., about 0.5 inches or less) that the rotation of impeller 20 (e.g., about 4.5 inches in diameter more or less and rotating at about 20,000 rpm more or less) induces a centrifugal airflow pattern within clearance 84 to create a vacuum in dead-space 82. thus the absolute air pressure or subatmospheric pressure in dead-space 82 is less than the positive pressure in discharge area 56 at discharge opening 48 and is also less than the generally atmospheric pressure in open space 62 (which is on the motor side of bearing 26).

When appreciable axial clearance exists at the seal's inner radial periphery 76 (e.g., seal's inside diameter), then the seal's inner periphery 76 will have the freedom to deflect, as shown in FIGS. 3 and 4. FIG. 3 shows motor 10 de-energized with seal 24 at its relaxed, undeflected state. FIG. 4 shows motor 10 energized with the upstream air pressure (generally atmospheric pressure) pushing down against the seal's motor side 86 to deflect seal 24 such that turbine side 78 of seal 24 engages axial abutment surface 80 of shaft 18. Deflecting seal 24 by way of generally atmospheric pressure is possible due to the vacuum on the opposite side of seal 23 at dead space area 82. In the example shown in FIGS. 1-4, axial abutment surface 80 on shaft 18 is a shoulder on sleeve 36 (shaft 18 comprises main shaft 34 and sleeve 36).

In other examples where no appreciable axial clearance exists at the seal's inner periphery 76 (e.g., abutment surface 80 engages the seal's turbine side 78 even when motor 10 is de-energized), the axial pressure differential across seal 24 will still urge seal 24 away from rotor 14 and toward impeller 20; however, there might not be any appreciable seal deflection.

In the example shown in FIGS. 5 and 6, a housing assembly 16' includes a step 88 that serves as an axial abutment surface against which an outer periphery 90 of a seal 24' can deflect in response to a pressure differential across seal 24'. FIG. 5 shows a motor 10' de-energized with seal 24' at its relaxed, undeflected state. FIG. 6 shows motor 10' energized with the upstream air pressure (generally atmospheric pressure) pushing down against the seal's motor side 86' to deflect seal 24' such that a turbine side 78' of seal 24' engages step 88.

Figure 7:
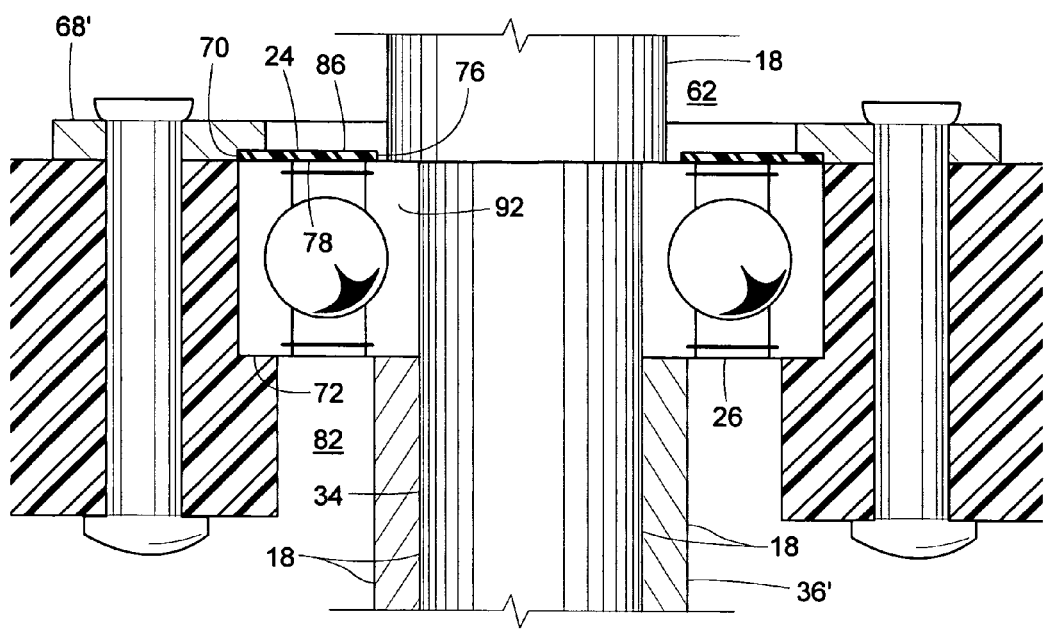
FIG. 7 is a cross-sectional view similar to FIGS. 2 and 4 but showing another example seal design.

In the example shown in FIG. 7, seal 24 is axially interposed between bearing 26 and rotor 14 with motor side 86 facing rotor 14 and turbine side 78 facing toward impeller 20. In this example, outer radial periphery 70 is axially clamped between a bearing retainer 68' and the bearing's outer race 72. At the seal's inner radial periphery 76, the seal's turbine side 78 rests upon the bearing's inner race 92, thus the bearing's inner race 92 provides as an axial abutment surface against which turbine side 78 seals, particularly in response to a pressure differential across seal 24. In this example, upstream air pressure (generally atmospheric pressure) in open space 62 urges seal 24 down away from rotor 14 toward impeller 20.

Figure 8:
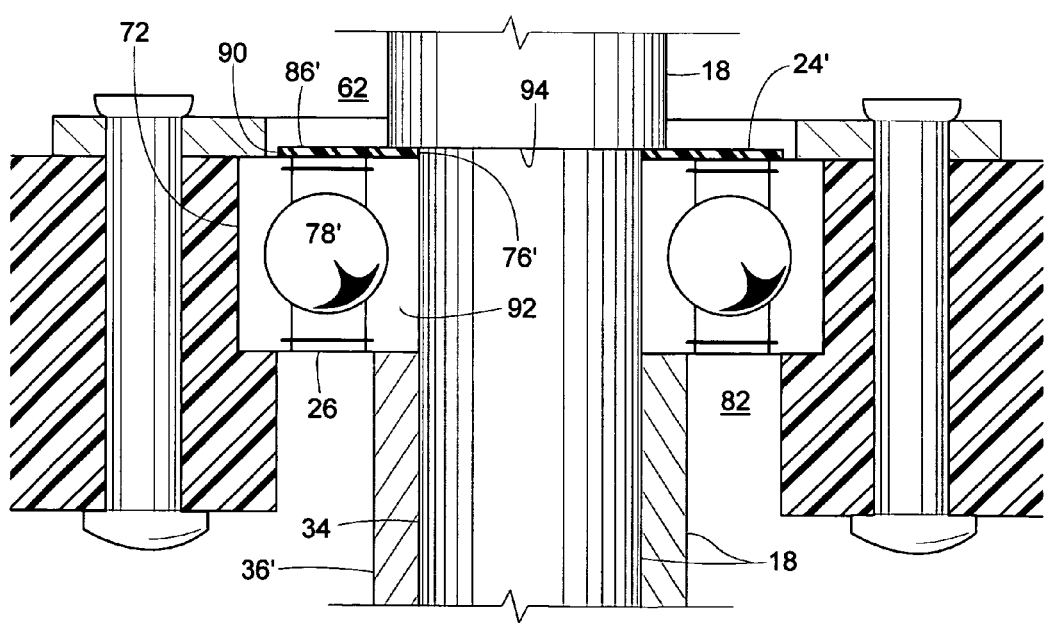
FIG. 8 is a cross-sectional view similar to FIGS. 2, 4 and 6 but showing yet another example seal design.

In the example shown in FIG. 8, seal 24' is axially interposed between bearing 26 and rotor 14 with motor side 86' facing rotor 14 and turbine side 78' facing toward impeller 20. In this example, inner radial periphery 76a is axially clamped between a shaft shoulder 94 and the bearing's inner race 92. At the seal's outer radial periphery 90, the seal's turbine side 78' rests upon the bearing's outer race 72, thus the bearing's outer race 72 provides an axial abutment surface against which turbine side 78' seals, particularly in response to a pressure differential across seal 24'. In this example, upstream air pressure (generally atmospheric pressure) in area 62 urges seal 24' down away from rotor 14 toward impeller 20.

In some examples, seal 24 has an outer diameter of about 1.0 inches, an inner diameter of about 0.5 inches, a thickness of about 0.032 inches, and seal 24 is comprised mostly or entirely of polytetrafluoroethylene. To achieve desired wear resistance or lubricity, some examples of seal 24 are comprised of polytetrafluoroethylene impregnated with an additive such as molybdenum disulfide, graphite, brass powder, or combinations thereof. Other examples of seal 24 are made of other materials and/or different dimensions.

FIGS. 9 and 10 shows another example of the invention, wherein external seal 24 is installed in a motor 10" having a housing assembly 16" that includes a peripheral discharge. FIGS. 9 and 10 correspond to FIGS. 1 and 2, respectively. In the example of FIGS. 9 and 10, however, discharge housing 30' includes impeller housing 32', which provides the series of peripheral discharge openings 48' for releasing discharge air 42. The structure and function of seal 24 is otherwise basically the same for motors 10 and 10'.

In at least some of the aforementioned examples include one or more features and/or benefits including, but not limited to, the following:

In some examples, a motor for a vacuum appliance includes a bearing seal that is urged axially toward an impeller under the pressure of air at generally atmospheric pressure.

In some examples, a motor for a vacuum appliance includes a bearing seal that is urged axially toward an impeller under the pressure of air at generally atmospheric pressure, wherein radial clearance at the inner or outer periphery of the seal provides the seal with greater axial flexibility.

In some examples, seal wear is minimized by virtue of the seal relying on sliding sealing contact of a broad axial surface external to a bearing.

Although certain example methods, apparatus, and articles of manufacture have been described herein, the scope of the coverage of this patent is not limited thereto. On the contrary, this patent covers all methods, apparatus, and articles of manufacture fairly falling within the scope of the appended claims either literally or under the doctrine of equivalents.

The invention claimed is:

1. A motor comprising:
   a stator;
   a rotor in proximity with the stator;
   a housing assembly supporting the stator, the housing assembly includes a discharge housing that defines a discharge opening;
   a shaft extending from the rotor into the discharge housing;
   an impeller attached to the shaft such that the impeller and the rotor rotate as a unit to provide discharge air pressure at the discharge opening;
   a bearing supported by the housing assembly, the bearing supports the shaft and is axially interposed between the rotor and the impeller; and
   an external seal proximate the bearing and encircling the shaft, the seal includes a motor side and a turbine side, the motor side generally faces toward the rotor and the turbine side generally faces toward the impeller, the motor side being exposed to upstream air pressure, the turbine side being exposed to downstream air pressure, the downstream air pressure is less than the upstream air pressure and is less than the discharge air pressure, the downstream air pressure is at subatmospheric pressure, the upstream air pressure urges the seal against an axial abutment surface on at least one of the bearing, the shaft and the housing assembly, wherein a radial air clearance exists at one of the following: a) at an outermost radial periphery of the external seal, and b) at an innermost radial periphery of the external seal.

2. The motor of claim 1, wherein the external seal is between the bearing and the impeller.

3. The motor of claim 1, wherein the radial air clearance exists between at least one of the following: a) between the housing assembly and the outermost radial periphery of the external seal, and b) between the shaft and the innermost radial periphery of the external seal.

4. A motor comprising:
   a stator;
   a rotor in proximity with the stator;
   a housing assembly supporting the stator, the housing assembly includes a discharge housing that defines a discharge opening;
   a shaft extending from the rotor into the discharge housing;
   an impeller attached to the shaft such that the impeller and the rotor rotate as a unit to provide discharge air pressure at the discharge opening;
   a bearing supported by the housing assembly, the bearing supports the shaft and is axially interposed between the rotor and the impeller;
   an internal seal/shield captured radially between an inner race and an outer race of the bearing, the internal seal/shield having an inner diameter and an outer diameter; and
   an external seal proximate the bearing and encircling the shaft, the external seal includes a motor side and a turbine side, the motor side generally faces toward the rotor and the turbine side generally faces toward the impeller, the motor side being exposed to upstream air pressure, the turbine side being exposed to downstream air pressure, the downstream air pressure is less than the upstream air pressure and is less than the discharge air pressure, the downstream air pressure is at subatmospheric pressure, the upstream air pressure urges the seal against an axial abutment surface on at least one of the bearing, the shaft and the housing assembly, wherein a radial air clearance exists at one of the following: a) at an outermost radial periphery of the external seal, and b) at an innermost radial periphery of the external seal.

5. The motor of claim 4, wherein the upstream air pressure is at generally atmospheric pressure.

6. The motor of claim 4, wherein the external seal is disposed axially beyond the bearing.

7. The motor of claim 4, wherein the external seal has an innermost radial periphery that is smaller than the inner diameter of the internal seal/shield.

8. The motor of claim 4, wherein the innermost radial periphery of the external seal is smaller than the outer diameter of the internal seal/shield.

9. The motor of claim 4, wherein the external seal is between the bearing and the impeller.

10. The motor of claim 4, wherein the radial air clearance exists between at least one of the following: a) between the housing assembly and the outermost radial periphery of the external seal, and b) between the shaft and the innermost radial periphery of the external seal.

11. The motor of claim 4, wherein the impeller and the housing assembly define an axial clearance therebetween, the axial clearance is sufficiently small such that rotation of the impeller is what reduces the downstream air pressure against the turbine side to a level that is less than the discharge air pressure.

* * * * *